(12) United States Patent
Stilleke et al.

(10) Patent No.: US 8,998,328 B2
(45) Date of Patent: Apr. 7, 2015

(54) FITTING FOR A VEHICLE SEAT

(75) Inventors: Martin Stilleke, Recklinghausen (DE);
Andreas Rabbach, Solingen (DE); Eric Blass, Remscheid (DE)

(73) Assignee: Keiper GmbH & Co. KG,
Kaiserslautern (DE)

( * ) Notice: Subject to any disclaimer, the term of this patent is extended or adjusted under 35 U.S.C. 154(b) by 0 days.

(21) Appl. No.: 13/817,572

(22) PCT Filed: Aug. 1, 2011

(86) PCT No.: PCT/EP2011/003856
§ 371 (c)(1),
(2), (4) Date: May 2, 2013

(87) PCT Pub. No.: WO2012/022430
PCT Pub. Date: Feb. 23, 2012

(65) Prior Publication Data
US 2013/0207434 A1    Aug. 15, 2013

(30) Foreign Application Priority Data
Aug. 20, 2010  (DE) .......................... 10 2010 035 377

(51) Int. Cl.
*B60N 2/20*      (2006.01)
*B60N 2/225*     (2006.01)
(Continued)

(52) U.S. Cl.
CPC .............. *B60N 2/225* (2013.01); *B60N 2/2252* (2013.01); *B60N 2/2254* (2013.01); *B60N 2/682* (2013.01); *B60N 2/22* (2013.01); *B60N 2/2213* (2013.01)

(58) Field of Classification Search
CPC .. B60N 2/2252; B60N 2/2254; B60N 2/2213; B60N 2/2251

USPC .............. 297/354.12, 374, 362, 361.1, 354.1
See application file for complete search history.

(56) References Cited

U.S. PATENT DOCUMENTS 5,749,624 A * 5/1998 Yoshida .................... 297/367 R
5,871,414 A   2/1999 Voss et al.
(Continued)

FOREIGN PATENT DOCUMENTS

CN  1157784  8/1997
CN  1666904  9/2005
(Continued)

OTHER PUBLICATIONS

PCT International Preliminary Report on Patentability mailed Mar. 7, 2013.
(Continued)

*Primary Examiner* — Milton Nelson, Jr.
(74) *Attorney, Agent, or Firm* — Fletcher Yoder, P.C.

(57) ABSTRACT

The invention relates to a fitting for a vehicle seat, in particular for a motor vehicle seat, comprises a first fitting part and a second fitting part that can be rotated with respect to each other, a clip ring that is fixed to the first fitting part for holding both fitting parts axially together by an outer ring section and engaging the second fitting part by an inner annular section, and stops that define the limits of the relative rotation of both fitting parts and that comprise at least one limiting stop embodied as a clip ring and at least one locking stop joined to the second fitting part such that the limiting stop protrudes outwards from outside of the annular section of the clip ring, and the limiting stop is provided on a structural part secured to the second fitting part.

20 Claims, 6 Drawing Sheets

Figure 2:
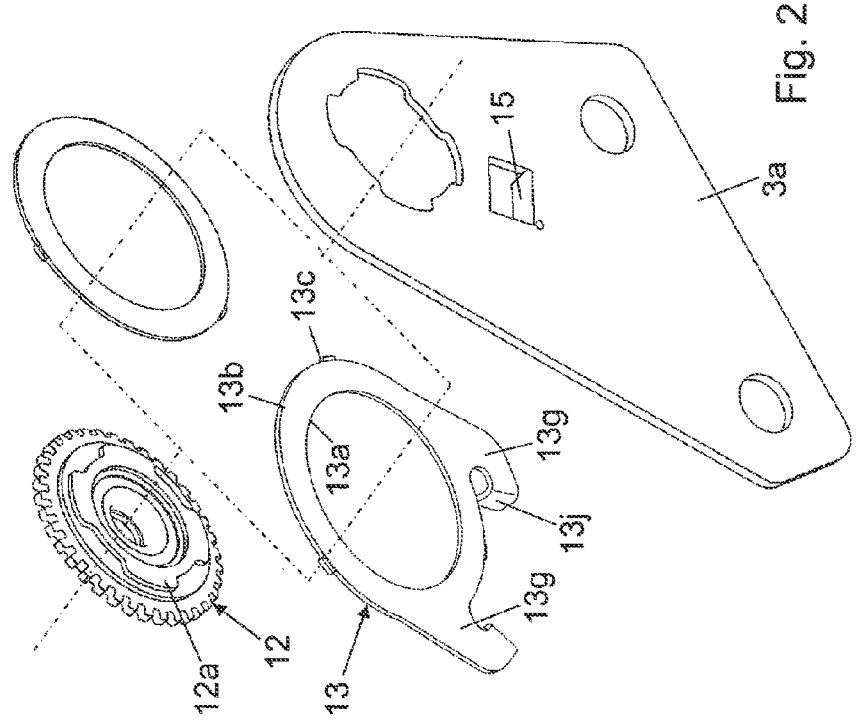

(51) Int. Cl.
*B60N 2/68* (2006.01)
*B60N 2/22* (2006.01)

(56) References Cited

U.S. PATENT DOCUMENTS

| | | | |
|---|---|---|---|
| 6,565,156 B1 * | 5/2003 | Yamashita et al. | 297/354.12 |
| 6,799,806 B2 | 10/2004 | Eppert et al. | |
| 7,455,361 B2 | 11/2008 | Stemmer et al. | |
| 7,726,743 B2 | 6/2010 | Smith et al. | |
| 8,286,777 B2 | 10/2012 | Kirubaharan | |
| 2009/0127910 A1 | 5/2009 | Stilleke et al. | |
| 2011/0101755 A1 | 5/2011 | Assmann | |
| 2012/0277050 A1 | 11/2012 | Jokiel et al. | |

FOREIGN PATENT DOCUMENTS

| | | |
|---|---|---|
| CN | 102481868 | 5/2012 |
| DE | 4436101 A1 | 6/1995 |
| DE | 4411214 | 10/1995 |
| DE | 19548809 | 5/1997 |
| DE | 19548809 C1 | 5/1997 |
| DE | 202009015235 U1 | 3/2010 |
| DE | 102009040504 A1 | 4/2010 |
| EP | 1055550 A2 | 11/2000 |
| JP | 07-279947 | 10/1995 |
| JP | 09-187337 | 7/1997 |
| JP | 2000-270949 | 10/2000 |
| JP | 2009-165647 | 7/2009 |
| WO | 2010121758 | 10/2010 |

OTHER PUBLICATIONS

Chinese Office Action dated Oct. 14, 2013.
Japanese Office Action date of delivery Oct. 15, 2013.
Japanese Office Action mailed Jan. 21, 2014.
Chinese Office Action dated Mar. 21, 2014.
Office Action of U.S. Appl. No. 13/508,951 dated Jun. 18, 2014.
International Search Report mailed Feb. 10, 2011.

* cited by examiner

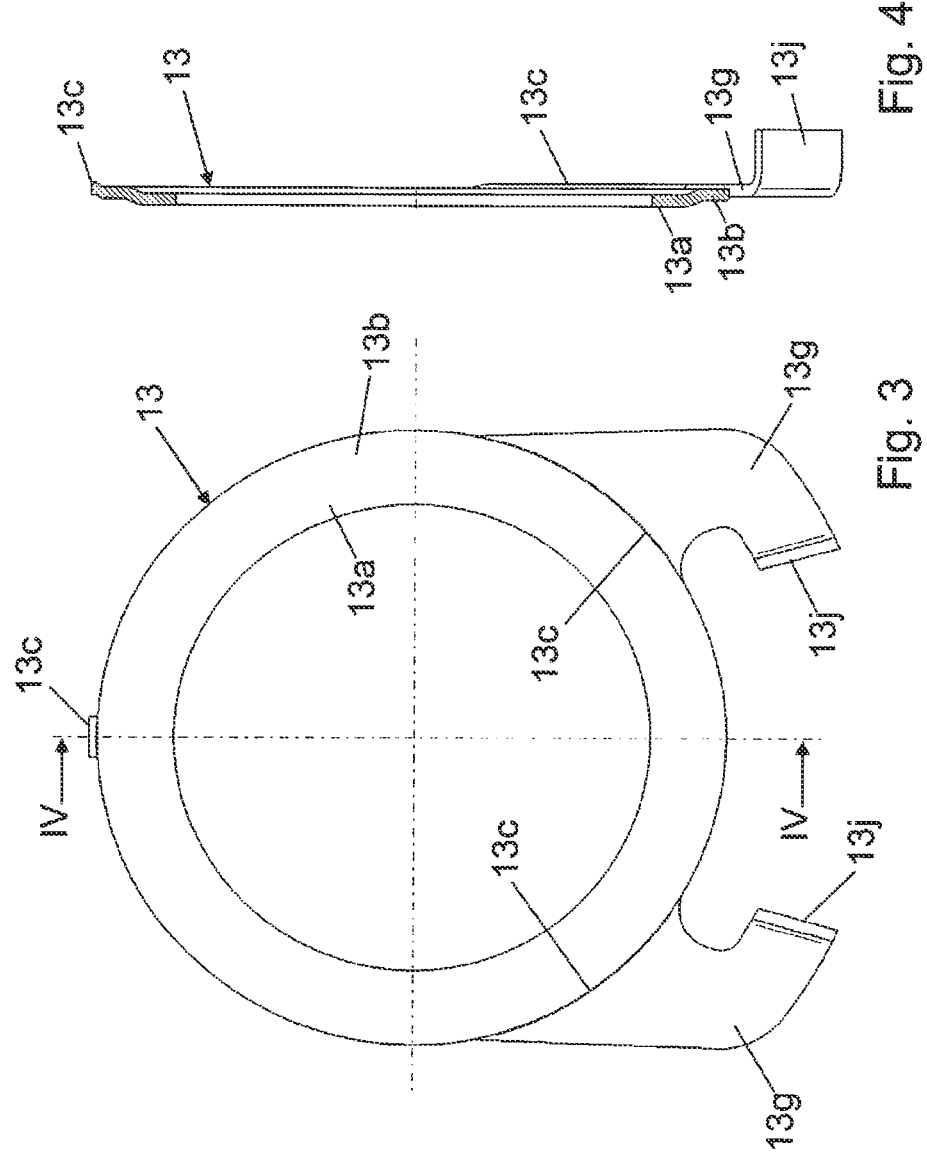

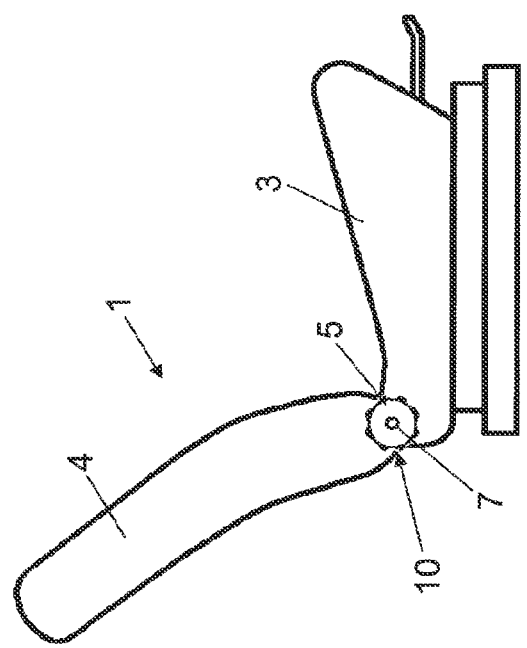
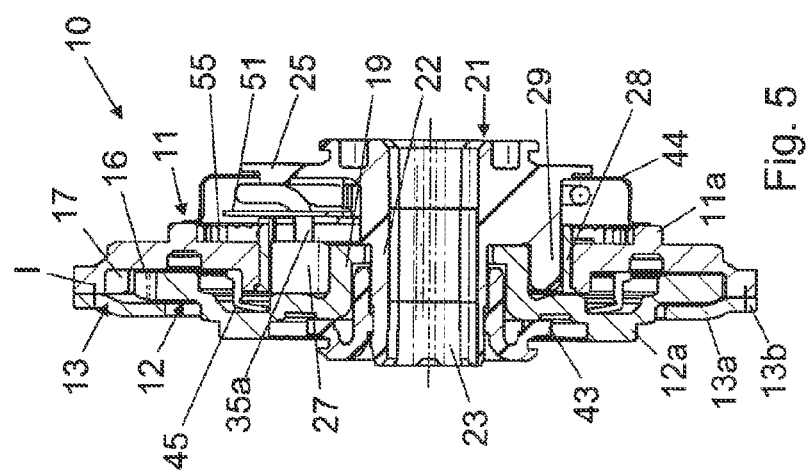

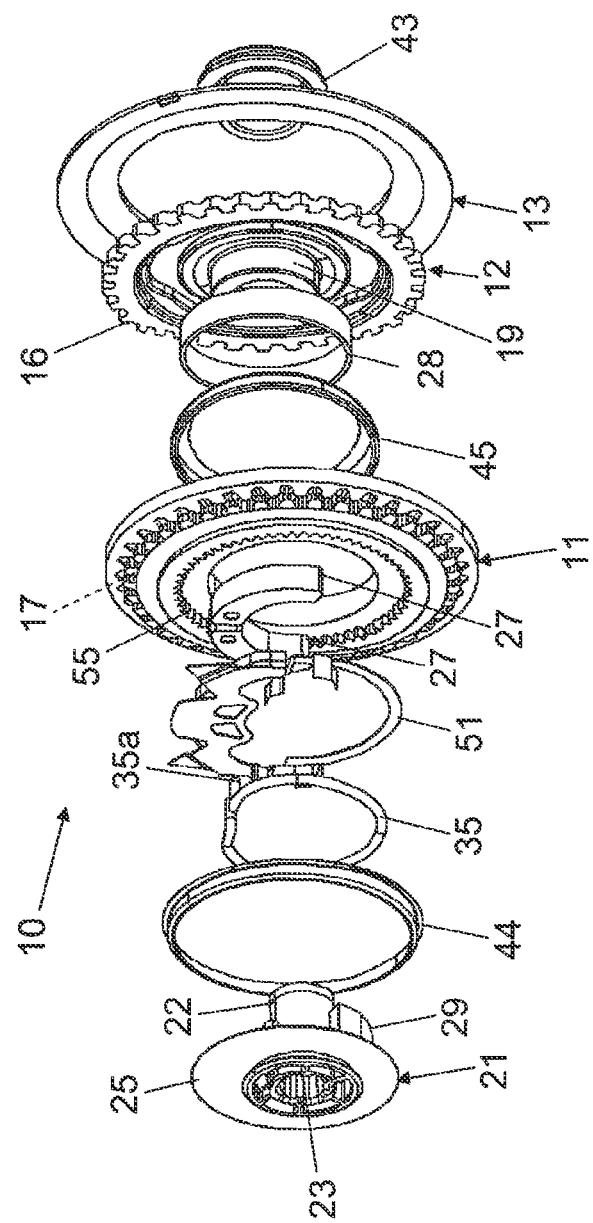

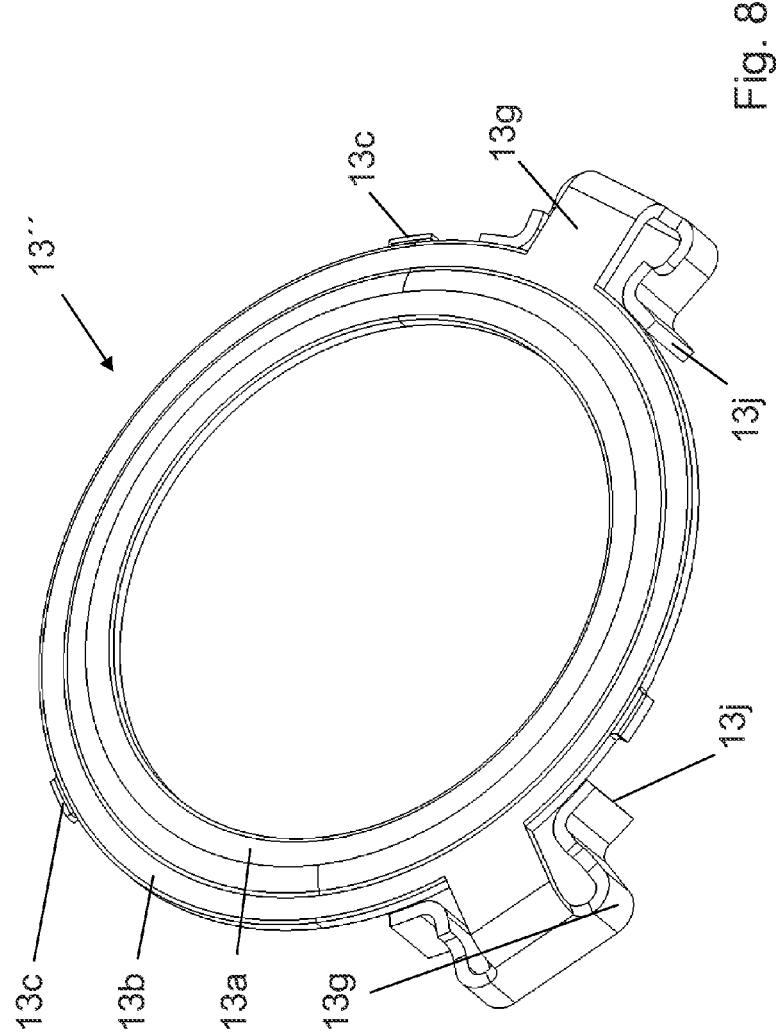

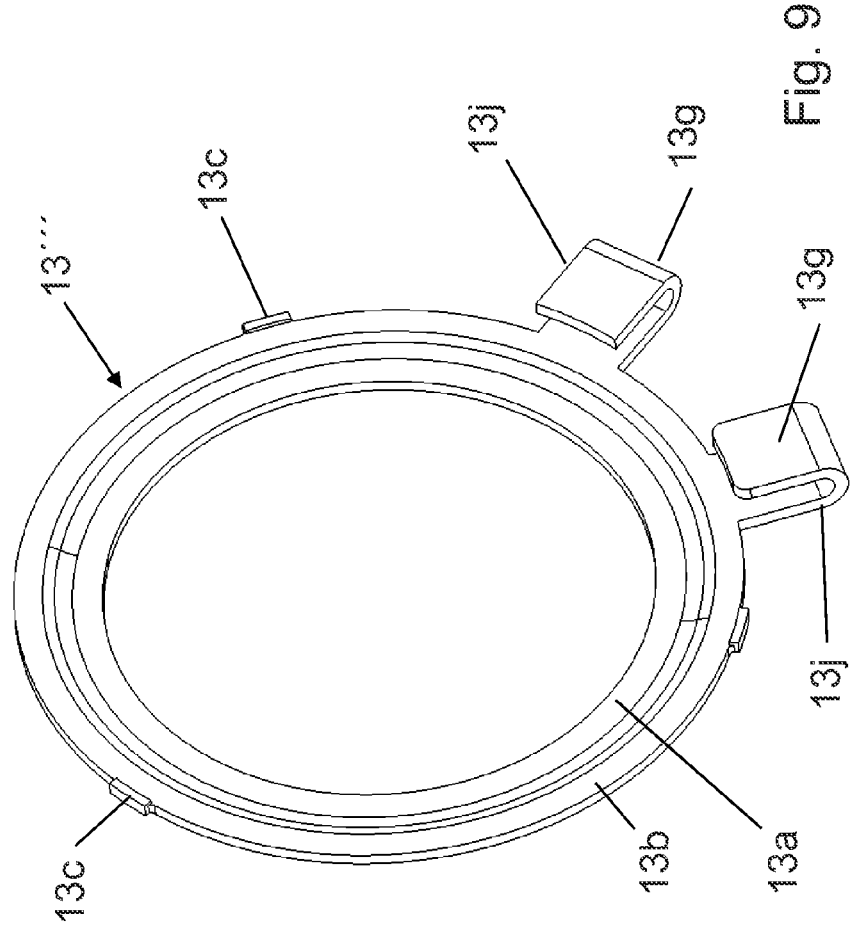

FITTING FOR A VEHICLE SEAT

CROSS REFERENCE TO RELATED APPLICATIONS

This application claims priority from and the benefit of PCT Application No. PCT/EP2011/003856, filed on Aug. 1, 2011; and German Patent DE 10 2010 035 377.9, filed on Aug. 20, 2010; both entitled "Fitting for a Vehicle Seat", which are herein incorporated by reference.

BACKGROUND

The invention relates to a fitting for a vehicle seat with the features of the precharacterizing clause of claim 1.

DE 10 2009 040 504 A1 discloses a fitting of this type, in which internal stops are formed on the clasping ring and on the second fitting part, said stops interacting in order to limit the inclination adjustment. However, the second fitting part therefore has an increased outlay on manufacturing, in particular when, for situations in which there is no requirement for internal stops, a further design of the second fitting part is required.

SUMMARY

The invention is based on the object of providing an alternative fitting of the type mentioned at the beginning. This object is achieved according to the invention by a fitting with the features of claim 1. Advantageous refinements are the subject matter of the dependent claims.

The moving of the blocking stop from the second fitting part onto the structural part reduces the outlay on manufacturing for the second fitting part. Since, as a rule, the structural part (or the adaptor) is formed individually for the specific vehicle seat, a significantly increased outlay on manufacturing is not required for this purpose. The protruding of the limiting stops from the clasping ring and the provision of the blocking stop on the structural part displace the stop surfaces radially outward, thus enabling greater torques or, in the event of an identical torque, reducing the stop forces. An advantageous combination is produced if the limiting stops have a step which serves as a centering section of the clasping ring on the first fitting part (before the fitting to one another). The provision of the limiting stops on the clasping ring has the advantage over limiting stops on the structural part or adaptor fastened to the first fitting part (and, as a result, fixedly connected to the clasping ring) that the formation of alternatives for the stops takes place on the clasping ring while the structural part (or the corresponding adaptor) which, for example, is fixed on the backrest, is fastened to the first fitting part and is significantly larger as a rule than the clasping ring may remain an identical part in this respect, which keeps the tool costs low. In addition, the radially protruding limiting stops have the advantage over the limiting stops formed in the circumferential surface of the clasping ring that they leave the material of the clasping ring unweakened.

The use of an eccentric epicyclic gearing in the fitting between a first fitting part and a second fitting part permits an infinitely variable inclination adjustment of the backrest. The elimination of a central pinion relative to a planetary gear system results in the production of a wobbling motion which is superimposed on the relative rotation of the fitting parts. The eccentric epicyclic gearing may be driven manually or by motor.

The main component for blocking the eccentric epicyclic gearing is applied by the friction between the eccentric and one of the two fitting parts, preferably the second fitting part, which preferably has a collar for supporting the eccentric. The wedge segments which define the eccentric serve both to block and to drive the rolling movement of toothed wheel and toothed rim. A preferably additionally provided blocking element serves to block the fitting under dynamic loads.

The formation of the toothed rim on the first fitting part, which receives the eccentric, and the formation of the toothed wheel on the second fitting part, which supports the eccentric, saves on material and construction space by the toothed wheel being able to be formed on the radially outer border of the second fitting part (which then embraces the clasping ring fastened to the first fitting part) and nevertheless sufficiently large connecting regions being available on the second fitting part for the installation of the fitting.

The invention is usable in vehicle seats between fittings and structural parts, but may also be used between other components of a vehicle seat.

DRAWINGS

Figure 1:
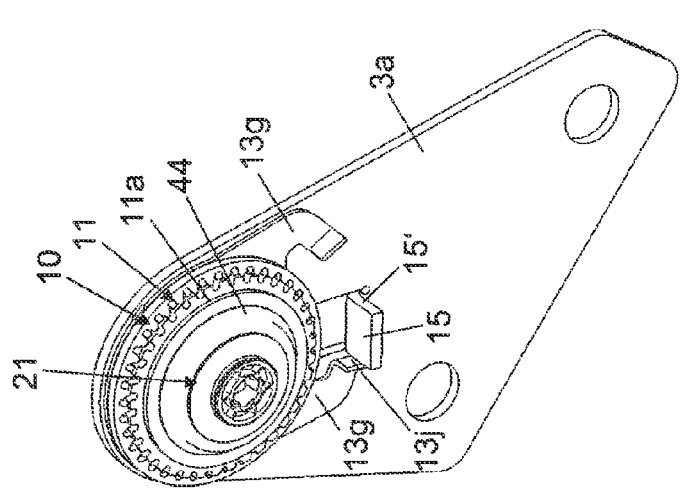

The invention is explained in more detail below with modifications and by reference to an exemplary embodiment which is illustrated in the drawing, in which FIG. 1 shows a perspective view of the fitting with an adaptor mounted on the seat part, FIG. 2 shows a different perspective view of the adaptor mounted on the seat part, of a second fitting part and of two alternative clasping rings, FIG. 3 shows a view of the clasping ring, FIG. 4 shows a section along the line IV-IV in FIG. 3, FIG. 5 shows a section through the fitting, FIG. 6 shows a schematic illustration of a vehicle seat, FIG. 7 shows an exploded illustration of the fitting, the limiting stops of which are concealed, FIG. 8 shows a perspective view of a modified clasping ring, and FIG. 9 shows a perspective view of a further modified clasping ring.

DETAILED DESCRIPTION

A vehicle seat 1 for a motor vehicle has a seat part 3 and a backrest 4, the inclination of which is adjustable relative to the seat part 3. For the inclination adjustment of the backrest 4, a drive shaft 7, which is arranged horizontally in the transition region between the seat part 3 and backrest 4, is rotated manually, for example by means of a hand wheel 5, or by motor, for example by means of an electric motor. On both sides of the vehicle seat 1, the drive shaft 7 engages in respective fittings 10 with conjoint rotation. The drive shaft 7 defines the directional details used of a cylindrical coordinate system.

The fitting 10 has a first fitting part 11 and a second fitting part 12, which are rotatable relative to each other. The two fitting parts 11 and 12 can each be approximately inscribed in a circular disk shape. The two fitting parts 11 and 12 preferably consist of metal, in particular steel, which may be hardened at least in regions. In order to absorb the axially acting forces, i.e. in order to hold the fitting parts 11 and 12 together, a clasping ring 13 is provided. The principle of such a holding-together action by means of a clasping ring is described, for example, in U.S. Pat. No. 6,799,806 B2. The clasping ring 13 preferably consists of metal, in particular steel, which is preferably unhardened. The clasping ring 13 has a substantially flat ring form, in the present case with a (radially) inner ring section 13a, a (radially) outer ring section 13b, optionally at least one centering section 13c and optionally connecting sections in between.

The clasping ring 13 is fixedly connected to one of the two fitting parts 11 and 12, in the present case is, for example, welded in the outer ring section 13b to the first fitting part 11, or, in an alternative embodiment, is crimped (at least partially in the circumferential direction). By means of its radially inwardly pointing border, i.e. in the present case, the inner ring section 13a arranged in a plane perpendicular to the axial direction, the clasping ring 13, optionally with interposition of a separate sliding ring, which is movable relative thereto, embraces the other of the two fitting parts 11 and 12 radially on the outside (i.e. in the radially outer border region thereof) without obstructing the relative rotation of the two fitting parts 11 and 12. In addition, the mutually facing inner surfaces of the two fitting parts 11 and 12 are protected against the penetration of foreign bodies and from soiling and damage.

The outer ring section 13b can be arranged in a plane offset axially slightly (for example by the material thickness of the sliding ring) with respect to the inner ring section 13a toward the first fitting part 11, or can be bent in the profile at a certain angle with respect to the inner ring section 13a. However, it is also possible for the outer ring section 13b and the inner ring section 13a to merge flat into each other (i.e. without a step and/or bend and therefore imperceptibly), i.e. to be defined merely by the respective adjacency thereof to the different fitting parts 11 and 12. By means of the outer ring section 13b, the clasping ring 13 bears—preferably in a sheet like manner—against the inner surface of the first fitting part 11, in more precise terms against the inner end side thereof in a radially outer border section, and is fastened there to the first fitting part 11.

The clasping ring 13 and the fitting part 11 or 12 fixedly connected thereto therefore clasp the other of the two fitting parts 11 and 12 which is movable relative to the clasping ring and other fitting part. In a structural respect, the two fitting parts 11 and 12 therefore together (with the clasping ring 13) form a disk-shaped unit.

The optional centering section 13c extends in the axial direction in relation to the outer ring section 13b preferably by, at maximum, one material thickness of the clasping ring 13. The centering section 13c embraces the first fastening part 11 radially on the outside, i.e. the centering section 13c covers the first fitting part 11 partially on the outer surface thereof, in more precise terms in the cylindrical region of the outer surface thereof. The centering section 13c may be embossed (i.e. the material at the border of the outer ring section 13b is advanced in the axial direction, for example by half the material thickness of the clasping ring 13). The centering section 13c may also be formed by border repositioning (i.e. the material at the border of the outer ring section 13a is bent over by 90°). In the circumferential direction, the centering section 13c may encircle in a completely closed manner or may be interrupted, for example just into two wider arc pieces, into three narrower arc pieces or into a narrow arc piece and two wide arc pieces. In all cases, the centering section 13c serves exactly to position the clasping ring 13 before the fastening to the first fitting part 11, i.e. concentrically with respect to the first fitting part 11. In addition, the centering section 13c increases the strength of the ready assembled fitting 10. In the alternative embodiment completely encircling in the circumferential direction, before the positioning on the first fitting part 11, the centering section 13c protects the ring form of the clasping ring 13 from deformation due to axially acting forces, for example during transport after the punching-out operation.

The clasping ring 13 can be fastened to the first fitting part 11 by means of laser welding or by means of another fastening technique known per se. In the case of laser welding, for example, an I seam I can be produced at a butt joint, for example between the outer ring section 13b and the first fitting part 11, or an I seam I can be produced at an overlapping joint ("through-cut"), specifically from the axial or from the radial direction. The I seam I may be formed in a manner distributed over the circumference with a plurality of individual interrupted weld seam sections, or with a single encircling weld seam.

With the installation of the fitting 10, the first fitting part 11 is, for example, connected fixedly to the structure of the backrest 4, i.e. is mounted on the backrest. The second fitting part 12 is then connected fixedly to the structure of the seat part 3, i.e. is mounted on the seat part. Said assignments of the fitting parts 11 and 12 are preferred if the radial distances of the fastening points between the fitting 10 and a relatively thin backrest plate as backrest side strut are intended to be as large as possible. However, the assignments of the fitting parts 11 and 12 may also be interchanged, i.e. the first fitting part 11 will then be mounted on the seat part and the second fitting part 12 mounted on the backrest. The fitting 10 lies in the force flux between the backrest 4 and seat part 3.

For a defined intersection of the fitting 10 with respect to the structures of seat part 3 and backrest 4, axially projecting contours are provided on the two fitting parts 11 and 12, said contours interacting in a form-fitting manner with corresponding openings in structural parts of the seat part 3 and of the backrest 4, for example in customer-specific adaptors or directly in the seat frame side part or backrest side strut. In the present exemplary embodiment, such a structural part 3a is represented by an adaptor mounted on the seat part. The fitting 10 which is thus prepositioned can then be fastened to the particular structural part, for example by laser welding or MAG welding. In laser welding, an I seam I may be provided between the fitting 10 and the structural part 3a as encircling (or partially interrupted) weld seam. In the butt joint, the I seam I can be provided between the axially projecting contour and the border of the opening receiving the contour, or in the overlapping joint. In the case of MAG welding, the weld seam is preferably provided only at individual marked points along the butt joint. The butt joint is optionally partially widened with a clearance by the border of the opening being provided with a step or bevel such that the weld seam can better penetrate in between and also acts in a better connecting manner in the radial direction.

In the present case, a circular ring shoulder 11a is formed on the first fitting part 11—on the end side thereof facing away from the second fitting part 12, for example by material being pushed out during the embossing of the first fitting part 11. The ring shoulder 11a reaches in a form-fitting manner through a circular opening in the backrest side strut such that the backrest side strut comes to bear against the first fitting part 11 in that part of the end side of the first fitting part 11 which is arranged radially outside the ring shoulder 11a. A weld seam is then provided along the outer edge of the ring shoulder 11a. In the case of laser welding, the weld seam may weave around the circular-ring-shaped profile of the outer edge of the ring shoulder 11a.

In the present case, a star-shaped shoulder 12a is formed on the second fitting part 12—on the end side thereof which faces away from the first fitting part 11. The star-shaped shoulder 12a has a multi-armed, substantially symmetrical star shape (in the present case a four-armed cross). The substantially symmetrical star shape may be exactly symmetrical or may have a deviation with respect thereto, the size of which is small in comparison to the (radial) dimensions of the star-shaped shoulder 12a, and by means of which (in addition to the star shape) a positioning aid or means of securing against rotation is provided, forcing the form-fitting connection with the structural part 3a in precisely one possible orientation.

In the case of the star-shaped shoulder 12a here, each arm ends with convex arcs (and a straight section), and, in the present case, the arms each merge tangentially one into another with a concave arc (and a straight section). Circular arcs, i.e. having a constant curvature, are preferred, but other arcs, in particular trigonometric arcs, are also conceivable. In the present case, for construction space reasons, a further pushed-out portion is provided in the center of the star-shaped shoulder 12a. The star-shaped shoulder 12a reaches in a form-fitting manner through a precisely matching opening in the adaptor mounted on the seat part (or in the seat frame) such that the adaptor mounted on the seat part (or the seat frame) comes to bear against the second fitting part 12 in that part of the end side of the second fitting part 12 which is arranged radially outside the star-shaped shoulder 12a. A weld seam is then provided along the outer edge of the star-shaped shoulder 12a. In the case of laser welding, said weld seam can weave around the outer edge of the star-shaped shoulder 12a. In the case of MAG welding, a short weld seam is provided, for example, at the end of each arm.

The star-shaped shoulder 12a has the advantage that, during the formation thereof, only some of the material of the second fitting part 12 has to be pushed out (pressed out), and nevertheless relatively large distances between the fastening points arise. In addition, a certain orientation of the second fitting part 12 can be forced as the need arises (because of the star shape and optionally because of deviation from the exact symmetry). In a modified embodiment, a star-shaped shoulder is also provided instead of the ring shoulder 11a on the first fitting part 11.

In order to limit the adjustment range during the inclination adjustment of the backrest 4 forward and/or rearward, i.e. in order to limit the relative rotation of the first fitting part 11 and of the second fitting part 12, stops are provided, of which in each case at least one is fixedly connected—directly or indirectly—to one of the fitting parts 11 or 12. In the present case (exactly) one blocking stop 15 protrudes axially from the structural part 3a fastened to the second fitting part 12, and (exactly) two limiting stops 13g (of the clasping ring 13 fastened to the first fitting part 11) receive said blocking stop therebetween in the circumferential direction. The number and function of the stops may also be reversed. The two limiting stops 13g protrude outward radially from the outer ring section 13b of the clasping ring 13—and optionally in addition in the circumferential direction. The blocking stop 15 is preferably integrally formed on the structural part 3a, for example is pushed out of the structural part 3a. The blocking stop 15 may also be formed separately and fastened, in particular welded, to the structural part 3a. The two sides 15' of the blocking stop 15, which sides point in the circumferential direction and, in the present case, are caused by the pushing-out operation to be J-shaped, serve as stop surfaces.

The limiting stops 13g are preferably integrally formed on the clasping ring 13, i.e. formed as an integral part thereof, but may also be formed separately and fastened thereto. The centering section 13c and the limiting stops 13g may be arranged independently of each other on the outer ring section 13b of the clasping ring 13 (FIG. 2) (wherein the centering section 13c may also be omitted), or the two wide arc pieces of the centering section 13c form the transition to the two limiting stops 13g (FIGS. 3+4), i.e. the limiting stops 13g are integrally formed on the centering section 13c and are stepped with respect to the outer ring section 13b. The limiting stops 13g are of hook-shaped design with a part protruding radially and/or in the circumferential direction, a part which is (preferably) perpendicular thereto and points toward the other limiting stop 13g in each case, and a part which is perpendicular thereto, i.e. protrudes in the axial direction, with a stop surface 13j, which points in the circumferential direction, for the blocking stop 15 (and the sides 15' thereof).

It is conceivable to provide a construction kit for the various uses (FIG. 2), from which, alternatively, either a clasping ring 13 without stops or a clasping ring 13 with limiting stops 13g may be selected, and in a matching manner with respect thereto, an adaptor 3a which is mounted on the seat part without or with a blocking stop 15.

FIG. 8 illustrates a modified clasping ring 13", the two limiting stops 13g of which each have—on both sides in the circumferential direction—a radial bent portion. The respective free end of the bent portions pointing in the circumferential direction serves as a stop surface 13j. The bent portion constitutes a spring, thus resulting in gentle bearing of the stop surface 13j against the blocking stop 15. FIG. 9 illustrates a further modified clasping ring 13''', the two limiting stops 13g of which are bent over in the axial direction. This results in U-shaped stop surfaces 13j.

The fitting 10 is designed as a geared fitting, in which the first fitting part 11 and the second fitting part 12 are connected to each other by means of a gearing for adjustment and fixing, in more precise terms by means of a—in the present case self-blocking—eccentric epicyclic gearing, as described, for example, in DE 44 36 101 A1.

In order to form the gearing, an externally toothed wheel 16 is formed on the second fitting part 12 and an internally toothed rim 17 is formed on the first fitting part 11, said toothed wheel and toothed rim meshing with each other. The diameter of the addendum circle of the outer toothing of the toothed wheel 16 is smaller by at least one tooth height than the diameter of the dedendum circle of the inner toothing of the toothed rim 17. A corresponding difference in the number of teeth of toothed wheel 16 and toothed rim 17 of at least one tooth permits a rolling movement of the toothed rim 17 on the toothed wheel 16. The toothed wheel 16 and toothed rim 17 are preferably formed by means of a single stamping and punching operation which, at the same time, punches the fitting parts 11 and 12 out of the starting material thereof. As an alternative, the fitting parts 11 and 12 may be produced—with similar geometries and identical functions—by solid deformation (preferably cold extrusion or hot extrusion). In the present case, the toothed wheel 16 forms the radially outer border of the second fitting part 12, i.e. the second fitting part 12 ends radially on the outside with the toothed wheel 16.

One of the two fitting parts 11 and 12 has a collar 19, in the present case the second fitting part 12, concentrically with respect to the toothed wheel 16. The collar 19 may be integrally formed as a collar formation on said fitting part (i.e. formed as a single piece) or fastened to said fitting part as a separate sleeve. A driver 21 is mounted rotatably in the collar 19 by means of a hub 22. The driver 21 is preferably composed of plastic. The hub 22 of the driver 21 is provided centrally with a bore 23 for receiving the drive shaft 7. The profile of the bore 23 is formed so as to match the profile of the drive shaft 7, in the present case a spline. Following its hub 22, the driver 21 has a covering disk 25 which is formed as a single piece with the hub 22 and has a larger diameter than the hub 22.

Two wedge segments 27 are supported—by means of the curved inner surfaces thereof—on the collar 19, said wedge segments—by means of the curved outer surfaces thereof—carrying the other of the two fitting parts 11 and 12, in the present case the first fitting part 11. To this end, a receptacle in the last-mentioned fitting part is lined with a plain bearing bushing 28 which is pressed in preferably non-rotatably and against which the outer surfaces of the wedge segments 27 bear. The terms "support" and "carry" are not intended to be limited to a certain direction of the force flux through the fitting 10, since said direction depends on the installation of the fitting 10.

The driver 21 has—radially spaced apart from the hub 22—a driver segment 29 which is held with play between the narrow sides of the wedge segments 27 and is formed as a single piece with the covering disk 25 and with the hub 22. The wedge segments 27, the wide sides of which face each other, each receive an angled end finger 35a of an omega-shaped spring 35, for example by means of a respective opening or by a recess defined by projecting portions of material. The spring 35 acts upon the wedge segments 27 in the circumferential direction, in particular in order to push said wedge segments apart, wherein, during operation, the wide sides of the wedge segments 27 can touch and act upon each other.

The driver 21 is axially secured on the outer side of the fitting part, which has the collar 19, by means of a securing ring 43 which is preferably clipped on. The securing ring 43 extends in the axial direction along part of the hub 22 such that the hub 22 does not bear directly against the inner side of the collar 19 but rather is mounted in the collar 19 with the interposition of the securing ring 43 (and, as a result, the driver 21 is mounted on the second fitting part 12). On the outer side of the fitting part having the plain bearing bushing 28 (in the present case the first fitting part 11), a sealing ring 44, for example made of rubber or soft plastic, is provided between the radially outer border of said fitting part and the covering disk 25 and is connected, in particular clipped, to the covering disk 25. The sealing ring 44 can also be formed from metal and fixedly connected, for example welded, to the first fitting part 11, wherein the covering disk 25 is then movable relative to the sealing ring 44. A separating ring 45 is optionally provided within the construction space between the two fitting parts 11 and 12 as an internal seal, said separating ring being composed, for example, of plastic.

The wedge segments 27 (and the spring 35) define an eccentric which, as an extension of the direction of eccentricity, presses the toothed wheel 16 into the toothed rim 17 at an engagement point. During drive by means of the (multiply) rotating drive shaft 7, a torque is first of all transmitted to the driver 21 and, by means of the driver segment 29, is then transmitted to the eccentric which is defined in this manner and which slides along the plain bearing bushing 28 displacing the direction of eccentricity and therefore displacing the engagement point of the toothed wheel 16 in the toothed rim 17, which is represented in the form of a wobbling rolling movement, i.e. as relative rotation with a superimposed wobbling movement. As a result, the inclination of the backrest 4 is adjustable steplessly between a plurality of use positions.

When one of the limiting stops 13g bears against the blocking stop 15, the rolling movement, and therefore the adjustment of the inclination of the backrest 4, is broken off.

In order to improve the dynamic operation behavior, a blocking spring 51 as disclosed, for example, in DE 195 48 809 C1 is preferably also provided as a blocking element. In the present case, the blocking spring 51 interacts with a toothing 55 which is formed as a further toothed rim on the first fitting part 11. The blocking spring 51—preferably mounted movably on an axial excess length of the plain bearing bushing 28—in each case blocks the wedge segments 27 in the non-driven state (by the blocking spring 51 blocking the spring 35 by means of bearing against the end fingers 35a) and is released by the driven driver 21.

The stops according to the invention have been described for a geared fitting, but are also usable for latching fittings, as disclosed, for example, in DE 20 2009 015 235 U1.

The invention claimed is:

1. A fitting for a motor vehicle seat, comprising a first fitting part and a second fitting part rotatable relative to each other, a clasping ring that, to axially hold the two fitting parts together, is fastened to the first fitting part by an outer ring section and embraces the second fitting part by an inner ring section, and stops that limit the relative rotation of the two fitting parts and that comprise at least one limiting stop formed on the clasping ring and at least one blocking stop connected to the second fitting part, wherein the limiting stop protrudes outwardly from the outer ring section of the clasping ring, and wherein the blocking stop is provided on a structural part fastened to the second fitting part;

wherein the limiting stop comprises a first part protruding at least radially from the clasping ring and at least one second part that protrudes from the first part and has a stop surface that points in a circumferential direction for the blocking stop.

2. The fitting as claimed in claim 1, wherein the outer ring section and the inner ring section merge flat one into the other.

3. The fitting as claimed in claim 1, wherein the limiting stop is integrally formed on or fastened to the outer ring section of the clasping ring.

4. The fitting as claimed in claim 1, wherein the outer ring section is arranged in a plane offset axially with respect to the inner ring section toward the first fitting part.

5. A vehicle seat, in particular motor vehicle seat, comprising a fitting as claimed in claim 1.

6. The fitting as claimed in claim 1, wherein the blocking stop is integrally formed on the structural part.

7. The fitting as claimed in claim 1, comprising two limiting stops that receive the blocking stop therebetween in the circumferential direction.

8. The fitting as claimed in claim 1, wherein the clasping ring has at least one centering section that extends axially from the outer ring section and embraces the first fitting part radially on the outside and partially covers the outer surface thereof 9. The fitting as claimed in claim 8, wherein the limiting stop is integrally formed on the outer ring section of the clasping ring by the centering section as a transition.

10. The fitting as claimed in claim 1, wherein a toothed rim is formed on one of the fitting parts and a toothed wheel is formed on the other of the fitting parts, the toothed rim and the toothed wheel meshing with each other, whereby the two fitting parts are in geared connection to each other.

11. The fitting as claimed in claim 10, wherein a rotatably mounted, revolving eccentric driven by a driver is provided for driving a relative rolling movement of toothed wheel and toothed rim.

12. A fitting for a motor vehicle seat, comprising a first fitting part and a second fitting part rotatable relative to each other, a clasping ring that, to axially hold the two fitting parts together, is fastened to the first fitting part by an outer ring section and embraces the second fitting part by an inner ring section, and stops that limit the relative rotation of the two fitting parts and that comprise at least one limiting stop formed on the clasping ring and at least one blocking stop connected to the second fitting part, wherein the limiting stop protrudes outwardly from the outer ring section of the clasping ring, and wherein the blocking stop is provided on a structural part fastened to the second fitting part;

wherein a toothed rim is formed on one of the fitting parts and a toothed wheel is formed on the other of the fitting parts, the toothed rim and the toothed wheel meshing with each other, whereby the two fitting parts are in geared connection to each other; and wherein a rotatably mounted, revolving eccentric driven by a driver is provided for driving a relative rolling movement of toothed wheel and toothed rim.

13. The fitting as claimed in claim 12, wherein the outer ring section is arranged in a plane offset axially with respect to the inner ring section toward the first fitting part.

14. The fitting as claimed in claim 12, wherein the outer ring section and the inner ring section merge flat one into the other.

15. The fitting as claimed in claim 12, wherein the limiting stop is integrally formed on or fastened to the outer ring section of the clasping ring.

16. The fitting as claimed in claim 12, wherein the blocking stop is integrally formed on the structural part.

17. The fitting as claimed in claim 12, comprising two limiting stops that receive the blocking stop therebetween in the circumferential direction.

18. The fitting as claimed in claim 12, wherein the clasping ring has at least one centering section that extends axially from the outer ring section and embraces the first fitting part radially on the outside and partially covers the outer surface thereof.

19. The fitting as claimed in claim 18, wherein the limiting stop is integrally formed on the outer ring section of the clasping ring by the centering section as a transition.

20. A vehicle seat, in particular motor vehicle seat, comprising a fitting as claimed in claim 12.

* * * * *